(12) United States Patent
Cleyet et al.

(10) Patent No.: US 11,549,393 B2
(45) Date of Patent: Jan. 10, 2023

(54) AIR-OIL HEAT EXCHANGER

(71) Applicant: SAFRAN AERO BOOSTERS SA, Herstal (BE)

(72) Inventors: Florian Cleyet, Herstal (BE); Bruno Servais, Herstal (BE); Aurore Fezas, Herstal (BE)

(73) Assignee: SAFRAN AERO BOOSTERS SA, Herstal (BE)

( * ) Notice: Subject to any disclaimer, the term of this patent is extended or adjusted under 35 U.S.C. 154(b) by 216 days.

(21) Appl. No.: 16/752,853

(22) Filed: Jan. 27, 2020

(65) Prior Publication Data

US 2020/0263561 A1 Aug. 20, 2020

(30) Foreign Application Priority Data

Feb. 18, 2019 (BE) .................... 2019/5105

(51) Int. Cl.
*F01D 25/08* (2006.01)
*F01D 25/18* (2006.01)
(Continued)

(52) U.S. Cl.
CPC ............. *F01D 25/08* (2013.01); *F01D 25/18* (2013.01); *F28D 1/0233* (2013.01); *F01D 25/12* (2013.01); *F01D 25/14* (2013.01); *F02C 7/14* (2013.01); *F05D 2260/213* (2013.01); *F05D 2260/22141* (2013.01); *F28D 1/0246* (2013.01); *F28D 7/0008* (2013.01); *F28D 7/0058* (2013.01);
(Continued)

(58) Field of Classification Search
CPC ..... F05D 2260/213; F05D 2260/22141; F02C 7/14; F01D 25/12; F01D 25/14; F28D 1/0233; F28D 7/106; F28D 7/0008; F28D 7/0058; F28D 9/02; F28D 2021/0026; F28D 1/0246; F28D 2021/0021; F28F 3/02; F28F 13/08; F28F 7/02; F28F 2215/04; F28F 2250/02; F28F 2265/02
See application file for complete search history.

(56) References Cited

U.S. PATENT DOCUMENTS 4,254,618 A * 3/1981 Elovic .................... F02C 7/185
60/39.83
5,269,135 A * 12/1993 Vermejan .................. F02C 7/04
60/266

(Continued)

FOREIGN PATENT DOCUMENTS

| EP | 1898069 A2 | 3/2008 |
| EP | 3012436 A1 | 4/2016 |
| WO | 2014120125 A1 | 8/2014 |

OTHER PUBLICATIONS

Search Report dated Oct. 30, 2019 for BE 201905105.

*Primary Examiner* — Joel M Attey
(74) *Attorney, Agent, or Firm* — James E. Walton

(57) ABSTRACT

A heat exchanger includes a plurality of fins arranged as a network and delimiting corridors, and an envelope having an internal wall and an external wall, the internal and external walls delimiting between them a channel for a flow of a first fluid in a main direction, the network of fins being arranged in the channel and connected to the internal and external walls, at least one passage for a flow of a second fluid being embedded in at least one of the internal and external walls, the channel being, in the main direction, divergent and then convergent.

11 Claims, 4 Drawing Sheets

(51) Int. Cl.
*F28D 1/02* (2006.01)
*F28D 7/00* (2006.01)
*F28D 7/10* (2006.01)
*F28D 21/00* (2006.01)
*F28F 3/02* (2006.01)
*F01D 25/12* (2006.01)
*F28D 9/02* (2006.01)
*F28F 13/08* (2006.01)
*F02C 7/14* (2006.01)
*F01D 25/14* (2006.01)
*F28F 7/02* (2006.01)

(52) U.S. Cl.
CPC ............... *F28D 7/106* (2013.01); *F28D 9/02* (2013.01); *F28D 21/00* (2013.01); *F28D 2001/0286* (2013.01); *F28D 2021/0021* (2013.01); *F28D 2021/0026* (2013.01); *F28F 3/02* (2013.01); *F28F 7/02* (2013.01); *F28F 13/08* (2013.01); *F28F 2215/04* (2013.01); *F28F 2250/02* (2013.01); *F28F 2265/02* (2013.01)

(56) References Cited

U.S. PATENT DOCUMENTS

| | | | |
|---|---|---|---|
| 7,377,100 B2* | 5/2008 | Bruno | F02K 3/06 60/39.08 |
| 7,861,512 B2* | 1/2011 | Olver | F02K 3/04 60/39.08 |
| 7,926,261 B2* | 4/2011 | Porte | F02C 7/14 60/782 |
| 7,946,806 B2* | 5/2011 | Murphy | F02C 7/14 415/176 |
| 8,069,905 B2* | 12/2011 | Goto | F28D 7/1653 165/145 |
| 8,387,362 B2* | 3/2013 | Storage | F02K 3/115 60/266 |
| 8,534,043 B2* | 9/2013 | Schwarz | F01D 25/12 244/57 |
| 8,721,271 B2* | 5/2014 | Wang | F02C 7/14 415/177 |
| 8,763,363 B2* | 7/2014 | Ranganathan | F28D 9/00 60/39.511 |
| 8,967,958 B2* | 3/2015 | Bajusz | F02C 7/14 415/178 |
| 9,593,594 B2* | 3/2017 | Diaz | F02C 7/00 |
| 9,810,150 B2* | 11/2017 | Schmitz | F02C 7/14 |
| 9,903,274 B2* | 2/2018 | Diaz | F28D 7/08 |
| 10,100,740 B2* | 10/2018 | Thomas | F28F 3/025 |
| 10,125,684 B2* | 11/2018 | Yu | F02C 3/04 |
| 10,156,404 B2* | 12/2018 | Ueda | F28F 3/12 |
| 10,253,785 B2* | 4/2019 | Kenworthy | F28F 13/12 |
| 10,406,601 B2* | 9/2019 | Martin | B33Y 80/00 |
| 10,508,598 B2* | 12/2019 | Weiner | F02C 7/06 |
| 10,578,020 B2* | 3/2020 | Kenworthy | F02C 7/222 |
| 10,655,540 B2* | 5/2020 | Carretero Benignos | F28D 7/005 |
| 10,823,201 B2* | 11/2020 | Kenworthy | F28F 3/04 |
| 2002/0148600 A1* | 10/2002 | Bosch | F28F 1/022 165/163 |
| 2006/0042225 A1* | 3/2006 | Bruno | F01D 25/18 60/226.1 |
| 2007/0215326 A1* | 9/2007 | Schwarz | F01D 25/18 165/96 |
| 2008/0053059 A1* | 3/2008 | Olver | F02C 7/14 60/226.1 |
| 2008/0053060 A1* | 3/2008 | Olver | F02C 7/14 60/226.1 |
| 2008/0095611 A1* | 4/2008 | Storage | F28F 1/022 415/116 |
| 2009/0031695 A1* | 2/2009 | Perveiler | F02K 3/115 60/39.5 |
| 2009/0097972 A1* | 4/2009 | Murphy | F02C 7/224 415/178 |
| 2009/0165995 A1* | 7/2009 | Bajusz | F28F 3/12 60/39.83 |
| 2010/0181052 A1* | 7/2010 | Burgers | F28D 9/0018 165/164 |
| 2011/0135455 A1* | 6/2011 | Wang | F01D 25/18 415/178 |
| 2011/0150634 A1* | 6/2011 | Bajusz | F02K 3/115 62/84 |
| 2012/0199335 A1* | 8/2012 | Maurer | F28D 7/0058 165/185 |
| 2012/0216506 A1* | 8/2012 | Eleftheriou | F28D 21/001 29/401.1 |
| 2012/0216543 A1* | 8/2012 | Eleftheriou | F28F 13/08 60/39.511 |
| 2012/0216544 A1* | 8/2012 | Eleftheriou | F02C 7/10 60/39.511 |
| 2013/0152392 A1* | 6/2013 | Swinford | B23H 9/00 29/890.03 |
| 2014/0202158 A1* | 7/2014 | Storage | F02C 7/14 60/722 |
| 2015/0292812 A1* | 10/2015 | Tomita | F02M 26/32 165/177 |
| 2016/0010863 A1* | 1/2016 | Ott | F28F 3/04 428/141 |
| 2016/0090863 A1* | 3/2016 | Diaz | F28D 20/003 60/39.1 |
| 2016/0108814 A1* | 4/2016 | Schmitz | F02C 7/08 60/39.511 |
| 2016/0108815 A1* | 4/2016 | Schmitz | F28D 1/0476 29/890.03 |
| 2016/0115864 A1* | 4/2016 | Campbell | F28F 3/048 29/888.012 |
| 2016/0123230 A1* | 5/2016 | Thomas | F02C 7/185 60/39.83 |
| 2016/0231068 A1* | 8/2016 | Schmitz | F28F 9/0265 |
| 2016/0265850 A1* | 9/2016 | Kupiszewski | F01D 25/12 |
| 2016/0333783 A1* | 11/2016 | Weiner | F02C 7/18 |
| 2017/0096938 A1* | 4/2017 | Kenworthy | F02C 7/14 |
| 2017/0146305 A1* | 5/2017 | Kuczek | F28F 9/0268 |
| 2017/0159491 A1* | 6/2017 | Hoefler | F02C 7/12 |
| 2017/0184028 A1* | 6/2017 | Sennoun | F02C 7/12 |
| 2017/0184029 A1* | 6/2017 | Yu | F02C 7/06 |
| 2017/0198976 A1* | 7/2017 | Turney | F28F 7/02 |
| 2017/0211478 A1* | 7/2017 | Storage | F02K 3/06 |
| 2017/0276440 A1* | 9/2017 | Kenworthy | F28F 1/34 |
| 2017/0284750 A1* | 10/2017 | Ueda | F28F 1/24 |
| 2018/0058472 A1* | 3/2018 | Tajiri | F28F 13/06 |
| 2018/0058473 A1* | 3/2018 | Kenworthy | F28F 3/04 |
| 2018/0094583 A1* | 4/2018 | Carretero Benignos | F28D 7/005 |
| 2018/0120032 A1* | 5/2018 | Anderson | F02K 3/105 |
| 2018/0327920 A1* | 11/2018 | Tajiri | C25D 1/02 |
| 2018/0328285 A1* | 11/2018 | Tajiri | F02C 9/18 |
| 2018/0345353 A1* | 12/2018 | Martin | F28D 9/0012 |
| 2019/0024987 A1* | 1/2019 | Moore | F28F 3/12 |
| 2019/0203734 A1* | 7/2019 | Kenworthy | B23P 15/26 |
| 2019/0211949 A1* | 7/2019 | Custer | F16L 9/19 |

* cited by examiner

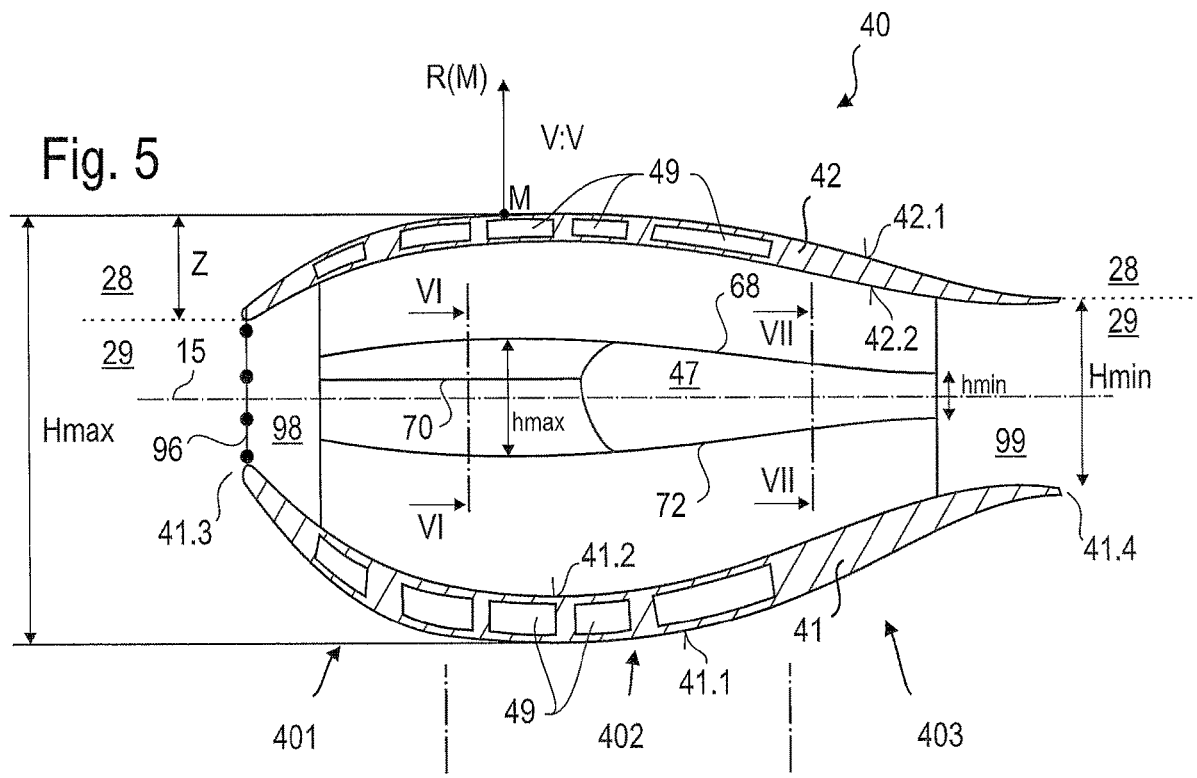
Fig. 5
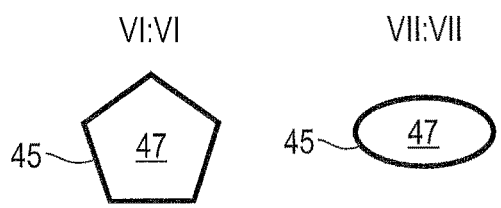

AIR-OIL HEAT EXCHANGER

This application claims priority under 35 U.S.C. § 119 to Belgium Patent Application No. 2019/5105, filed 18 Feb. 2020, titled "Air-Oil Heat Exchanger," which is incorporated herein by reference for all purposes.

BACKGROUND

1. Field of the Application

The present application relates to the field of turbomachine heat exchangers. More specifically, the present application provides an air/oil heat exchanger for a turbomachine.

2. Description of Related Ail

It is known to use heat exchangers to cool the lubricating or cooling oil of a turbomachine. For example, the air flow can pass through a network of cooling fins, which, by conduction/convection, dissipate the heat of the oil in the air flow. The standard exchanger extends into the air channel with a series of planar fins oriented radially and supported by a hollow tubular wall traversed by the oil.

However, the cooling fins can disrupt the flow of air and may therefore impact the performance of the turbomachine. There is therefore a need to improve the design of a heat exchanger of this type.

Although great strides have been made in the area of turbomachine heat exchangers, many shortcomings remain.

DESCRIPTION OF THE DRAWINGS

FIG. 5 illustrates a view of the heat exchanger parallel to the axis of the turbomachine.

DETAILED DESCRIPTION OF THE PREFERRED EMBODIMENT

Figure 1:
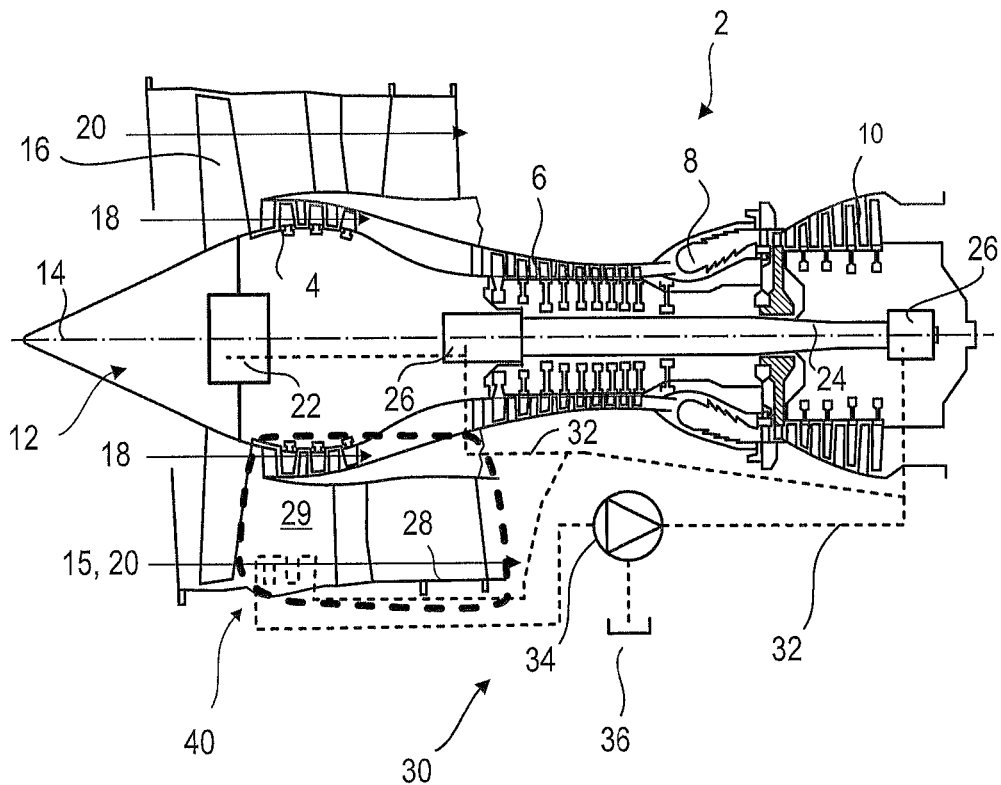
FIG. 1 represents a turbomachine according to the present application.

The present application aims to provide a heat exchanger which minimizes the air flow aerodynamic losses induced by the presence of the exchanger in the air channel. Also, the aerodynamic losses induced by the air flow at the heart of the exchanger are reduced. The present application also aims to improve the heat exchange and to provide an exchanger with a reduced weight compared to existing exchangers.

The subject-matter of the present application is a heat exchanger comprising a plurality of fins arranged as a network and delimiting corridors, and an envelope comprising an internal wall and an external wall, the internal and external walls delimiting between them a channel for a flow of a first fluid in a main direction, the network of fins being arranged in the channel and connected to the internal and external walls, at least one passage for a flow of a second fluid being embedded in at least one of the internal and external walls, the channel being, in the main direction, divergent and then convergent.

In other words, the present application is a heat exchanger, comprising: a network of fins delimiting corridors for the flow of a first fluid in a main direction of flow; and an envelope surrounding the network of fins, the envelope being provided with passages for the flow of a second fluid; the envelope being of generally arcuate shape, defining the main direction of flow of the first fluid, as well as a radial direction and a circumferential direction, the envelope comprising an outer surface defining a profile of the exchanger, seen in a plane perpendicular to the main direction; wherein in the axial direction, the profile varies radially and circumferentially.

Both the radial direction and the circumferential direction are perpendicular to the main direction of flow at any point.

The variations in the profile are reflected in the fact that the outline of the envelope in a given plane perpendicular to the axial direction is different from the outline in another plane, parallel to the given plane.

According to a preferred embodiment, the envelope has two side walls connecting the internal wall to the external wall.

According to a preferred embodiment, the network of fins is circumscribed radially internally and externally, and circumferentially by the envelope. Thus, the fins network extends radially from the inner wall to the outer wall, and circumferentially from one side wall to the other, without protruding beyond the walls.

According to a preferred embodiment, the internal and external walls are arched, seen in a plane perpendicular to the main direction, wherein the envelope has a radial height between the internal wall and the external wall, the radial height defining a radial direction perpendicular to the main direction, the radial height of the envelope being variable along the main direction, and wherein the envelope has a circumferential width between the side walls defining a circumferential direction perpendicular to the radial direction and to the main direction, the circumferential width being variable along the main direction.

According to a preferred embodiment, the radial height of the envelope and/or the circumferential width of the envelope increases in at least an upstream third of the envelope.

According to a preferred embodiment, the radial height of the envelope and/or the circumferential width of the envelope decreases in at least a downstream third of the envelope.

According to a preferred embodiment, the at least one passage extends in the internal wall and in the external wall, as well as in at least one of the side walls. Thus, the second fluid can circulate and come close to numerous fins. Thus, increasing the heat exchanges, in particular in comparison with an air-oil exchanger with radial fins, the fins of which would only be radially in contact with the oil at one of their ends;

According to a preferred embodiment, the at least one passage extends in a plane that is perpendicular to the main direction.

According to a preferred embodiment, at least one of the internal and external walls has an internal surface and an external surface, wherein both internal and external surfaces contact the first fluid.

According to a preferred embodiment, at least one of the internal and external walls has an internal surface and an external surface, wherein the internal and external surfaces are joined together by a leading edge and by a trailing edge.

Indeed, the air flow arriving in the vicinity of the exchanger separates radially into a flow which traverses the interior of the heat exchanger and a flow which bypasses it. After passing through the heat exchanger, the air flow heated by the exchanger joins the air flow which has bypassed the exchanger. The separation and reunification of flows can be a source of aerodynamic disturbances. The particular design of the envelope makes it possible to limit these disturbances. The leading edge can extend from the inner wall to the outer wall through the side walls to form one single leading edge. Likewise, the trailing edge may be a single edge common to the internal and external and lateral walls.

According to a preferred embodiment, the envelope has an axial length which varies circumferentially between a minimum value and a maximum value, these two values being comprised between 100 and 150 mm. For example, the axial length can be of 110 mm at the circumferential ends of the exchanger and 140 mm at the circumferential center. The minimums and maximums can alternatively take any value between 100 and 150 mm.

According to a preferred embodiment, the envelope has a circumferential width which varies, axially, between a minimum value and a maximum value, these two values being distinct from one another by at least 10%.

According to a preferred embodiment, the envelope has a radial height and the corridors have respective radial heights which vary along the main direction according to a similar trend as the variation of the radial height of the envelope. For example, the radial height can be 25 mm at the axial ends of the exchanger and 55 mm at around a third of the axial length of the exchanger, measured from upstream. The minimums and maximums can alternatively take any value between 5 and 60 mm.

By "trend" is meant that when the radial height of the envelope increases along an axial portion of the envelope, the radial height of the corridors also increases along the same axial portion.

According to a preferred embodiment, the envelope has a circumferential width and the corridors have respective circumferential widths which vary along the main direction according to a similar trend as the variation of the circumferential width of the envelope.

According to a preferred embodiment, the corridors extend parallel to the main direction.

According to a preferred embodiment, the fins extend perpendicularly to the internal and external walls, seen in a plane perpendicular to the main direction.

According to a preferred embodiment, the fins form patterns, seen in a plane perpendicular to the main direction, such as a honeycomb, polygons, ellipses, or any heterogeneous combination thereof.

According to a preferred embodiment, at least one corridor exhibits at least two patterns of different kind in two different planes perpendicular to the main direction, the at least two patterns including a polygon and an ellipse. The corridors can therefore have a shape which maximizes the heat exchange at the heart of the exchanger and which minimizes aerodynamic disturbances at the inlet and at the outlet of the exchanger.

According to a preferred embodiment, the fins have a thickness which varies along the main direction, the thickness being smaller at least in a downstream third of the exchanger than in an upstream third. The thickness is preferably greater in an upstream portion of the envelope to stiffen the structure and ensure its resistance to potential shocks from foreign matter (frost, debris). The thickness of the fins can vary between 0.3 mm and 0.8 mm.

According to a preferred embodiment, the fins and the internal and external walls have a respective roughness which varies along the main direction, the roughness decreasing at least in a downstream third of the exchanger. Greater roughness in an upstream portion of the envelope makes it possible to better slow down the first fluid and create turbulences to improve convection and therefore to improve the heat exchange. In a downstream portion of the envelope, a lower roughness makes it possible to re-accelerate the fluid and facilitate its flow out of the exchanger and its reintegration into the air stream. This also offers greater flexibility during manufacturing because the manufacturing constraints (tolerances) are less strict on part of the exchanger.

According to a preferred embodiment, the envelope and the fins are integrally made and are produced by additive manufacturing technology.

According to a preferred embodiment, the heat exchanger is made of aluminum alloy.

According to a preferred embodiment, the heat exchanger comprises further a grid for protecting the network of fins, the grid being arranged upstream of the network and upstream of the at least one passage of the second fluid, the grid being made in one piece with the envelope and the fins. Such a grid protects the exchanger from foreign elements (debris, frost).

According to a preferred embodiment, the heat exchanger comprises further a retarding chamber arranged upstream of the fins.

According to a preferred embodiment, the heat exchanger comprises further an acceleration chamber arranged downstream of the fins.

According to a preferred embodiment, the thickness of the walls of the envelope can be of several millimeters. The oil passages in the envelope can be several millimeters in height and in axial length. They preferably extend over the entire circumferential extent of the envelope.

According to a preferred embodiment, the heat exchanger comprises further an inlet manifold and an outlet manifold for the second fluid, the manifolds being in one piece with the envelope and the network of fins. The collectors can be circumferentially aligned and axially offset from one another.

According to a preferred embodiment, the heat exchanger comprises further a bypass connecting the inlet collector to the outlet collector, the bypass being in one piece with the network. The by-pass is a circuit which allows the second fluid not to pass through the passage of the envelope. To this end, a shutter or a valve, for example a thermostatic valve, can close the network and open the bypass. Thus, when the oil has a temperature below a predetermined threshold, it passes through the by-pass because it is not useful to cool it in the exchanger and/or the oil is not sufficiently fluid to travel through the passage. The threshold can for example be 20° C. The bypass can have a defrosting function by means of heating means, in particular channels allowing the flow of hot oil from the bypass to the heart of the exchanger.

According to a preferred embodiment, the bypass allows the flow of the second fluid in a substantially axial direction. Indeed, as the collectors are arranged on the same side of the exchanger, the bypass can be compact and simple in design.

The present application also relates to a turbomachine (turbine engine, turbojet) comprising a casing delimiting a path for an air flow and a heat exchanger as in one of the embodiments above being arranged in the path, the first fluid being the air flowing in the path.

According to a preferred embodiment, the turbomachine is a double flow turbomachine, comprising a primary flow path and a secondary flow path, the path receiving the heat exchanger being the secondary flow path.

According to a preferred embodiment, the internal wall has an internal surface and an external surface, both in contact with air.

According to a preferred embodiment, the external wall has an internal surface in contact with the air and an external surface free from contact with the air.

According to a preferred embodiment, the external wall has an internal surface and the air path is delimited by a casing and by the internal surface of the external wall.

According to a preferred embodiment, the heat exchanger is partially buried in the casing. This makes it possible to limit the front "visible" footprint of the exchanger and thus the disturbances of the flow which bypasses the exchanger. Also, this allows larger exchange surfaces because they are not limited to the air path.

According to a preferred embodiment, the envelope has a radial height and a point where the radial height is maximum, and wherein at the axial position of said point, at least 5% of the height of the heat exchanger is buried in the casing.

According to a preferred embodiment, the turbomachine has an axis of rotation and the main direction of the heat exchanger is parallel to the axis of rotation of the turbomachine. Alternatively, these directions can be tilted relative to each other.

The various embodiments can be combined as far as technically possible.

The present application makes it possible to increase the heat exchange while limiting the pressure losses of the air flow. In the context of a turbojet oil cooler, this solution becomes particularly relevant since the cold source is at very low temperature in addition to being available in large quantities given the flow rate of the secondary flow.

Additive manufacturing allows more complex designs by maximizing the upstream weight to stiffen the structure and protect it from any foreign element. Also, the total weight is lower than the weight of known exchangers.

In the following description, the terms "internal" and "external" refer to a positioning relative to the axis of rotation of a turbomachine (axis of rotation of the rotors of the compressors or turbines of the turbomachine). The axial direction corresponds to the direction along the axis of rotation of the turbomachine. The radial direction is perpendicular to the axis of rotation. Upstream and downstream are in reference to the main flow direction of the flow in the turbomachine.

In the illustrated embodiments, the heat exchanger is curved in shape around an axis which coincides with the axis of the turbomachine.

The exchanger defines a main direction of air flow, which in the illustrated embodiments, is parallel to the axis of the turbomachine. The "axial direction" and the "main direction" will be used for depicting both the same direction.

Unless stated otherwise, the length is measured along the axis, the width is measured circumferentially and the height is measured radially.

The thickness is the smallest dimension of an element characterizing the distance between two of its largest surfaces.

FIG. 1 shows in a simplified manner a turbomachine 2 which in this specific case is a turbojet with an axial double flow. The turbojet engine 2 comprises a low-pressure compressor 4 and a high-pressure compressor 6, a combustion chamber 8 and one or more turbines 10. In operation, the mechanical power of the turbine 10 is transmitted to the rotor 12 of the two compressors 4 and 6. The latter comprise several rows of rotor blades associated with rows of stator blades. The rotation of the rotor around its axis of rotation 14 thus makes it possible to generate an air flow and to compress it progressively until the inlet of the combustion chamber 8.

A fan 16 is coupled to the rotor 12 and generates an air flow which is divided into a primary flow 18 and a secondary flow 20 passing through an annular duct (partially shown) along the machine and then joining the primary flow at the outlet of the turbine.

Reduction means, such as a planetary reduction gear 22, can reduce the speed of rotation of the fan and/or of the low-pressure compressor relative to the associated turbine. The secondary flow can be accelerated so as to generate a thrust reaction necessary for the flight of an aircraft.

The rotor 12 comprises a transmission shaft 24 mounted on the casing by means of two bearings 26.

A casing surface 28 delimits radially outwardly a path 29 for the circulation of the secondary flow 20.

In order to lubricate the rotating elements of the turbojet engine 2, a lubrication circuit 30 is provided. This circuit 30 comprises conduits 32 for transporting the oil to the organs of the turbojet engine 2 requiring lubrication, such as in particular the gearbox 22 and the bearings 26. The circuit 30 for this purpose comprises a pump 34 for setting the oil in motion in circuit 30 and a tank 36.

A heat exchanger 40 is provided to regulate the temperature of the oil in the circuit 30. The exchanger 40 can be positioned in the secondary flow 20 to cool the oil using the cold air of the secondary flow. An installation area in dotted lines illustrates the positioning that the exchanger can take. This can be partially buried in the casing 28 or at the heart of the path 29. Alternatively, or in addition, the exchanger 40 can also be provided downstream of the bleed valves, to heat the fluids thanks to the hot air.

The circuit 30 includes all the organs making it possible to control the temperature, the pressure and the flow rate of the oil to obtain optimal operation (sensors, valves, booster pump, flow restrictor, etc.).

The tank 36 can be fixed to the nacelle of the turbomachine 2 or to a compressor casing. The tank 36 can be placed between two annular walls guiding concentric flows; for example between the secondary flow 20 and the flow surrounding the turbomachine 2, or between the primary flow 18 and the secondary flow 20.

Figure 2:
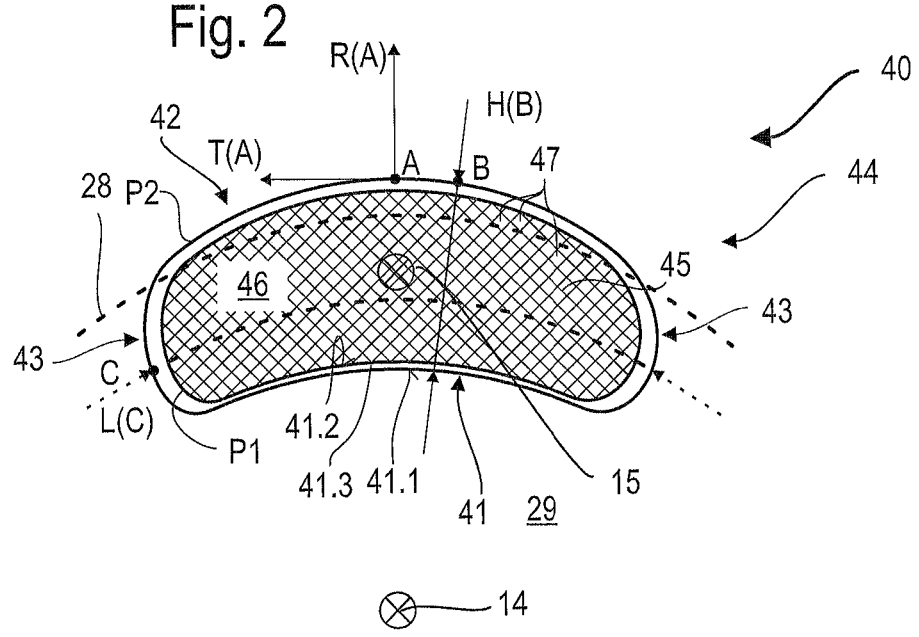
FIG. 2 illustrates a plan view of a heat exchanger according to the present application.

FIG. 2 shows a plan view of a heat exchanger 40 such as that shown in FIG. 1, seen in a plane perpendicular to the axis 14 of the turbomachine 2. The heat exchanger 40 has a generally circumferentially arcuate shape. It substantially matches the shape of the annular casing 28 of the turbomachine. It is traversed by the air of the secondary flow 20 which forms a first fluid, and receives oil forming a second fluid. It has an internal wall 41, an external wall 42 and optionally two side walls 43. The walls 41, 42, 43 form together an envelope 44 which surrounds a network of fins 45.

The internal 41 and external 42 walls define a channel 46 defining the main direction of air flow 15, which in this example is parallel to the axis 14. The channel 46 is occupied by the fins 45. The fins 45 define a multitude of corridors 47 which are subdivisions of channel 46.

The internal wall 41 has an internal surface 41.1 and an external surface 41.2. These two surfaces 41.1, 41.2 are in contact with the air, one being in contact with the air which remains in the circulation path 29 and the other in contact with the air which enters and traverses the channel 46.

The internal surface 41.1 is visible in this plan view because the envelope 44 has a dimension which varies along the axis 14. These variations are both circumferential and radial.

At any point on the internal wall 41 or external wall 42, a radial direction and a circumferential direction can be defined. For example, point A in FIG. 2 is an upper midpoint of the exchanger. The radial direction at this point is noted R (A) and the circumferential direction is noted T (A).

The label P refers to the outline of the envelope in several axial positions. In FIG. 2 which is a plan view, P1 denotes the smallest profile, for example at the upstream level, comprising the leading edge 41.3 where the external surface 41.2 and the internal surface 41.1 meet. P2 denotes the largest profile.

For each point of the envelope 44 a radial height of the envelope can be defined (for example H (B) at point B) and a circumferential width (for example L (C) at point C). Considering a point B' (not shown) axially downstream of point B and a point C' (not shown) axially downstream from point C. Variations in dimensions of the exchanger 40 can in particular be characterized by H(B)≠(B') and L(C)≠(C').

FIG. 2 finally shows in dotted lines the internal surface of the casing 28. We see that the exchanger 40 is partially buried in the casing 28. This allows the exchanger 40 to not be too prominent in the path 29 while allowing large heat exchange areas.

Figure 3:
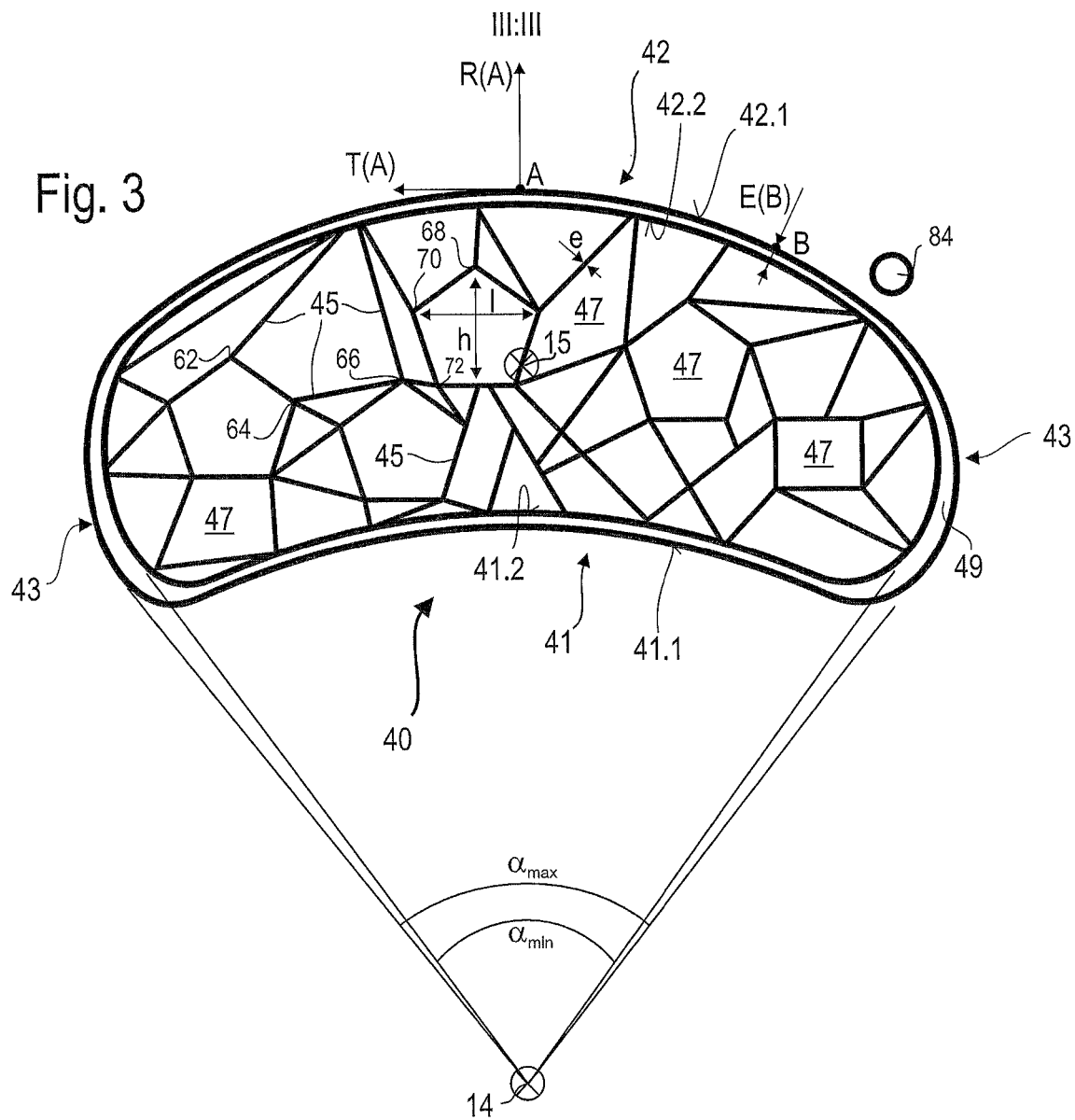
FIG. 3 shows a section of the exchanger in plane III: Ill defined in FIG. 4.

FIG. 3 illustrates an enlarged section of the exchanger 40 in the plane perpendicular to the axis 14 and indicated III: Ill in FIG. 4. Only a few corridors 47 are shown and the dimensions are not to scale. In particular, the thickness of the walls 41, 42, 43 and the dimensions of the corridors 47 are exaggerated to facilitate understanding of the drawing. FIG. 3 shows the midpoint A, similar to FIG. 2.

The fins 45 in this example form a trellis or a multitude of cross-roads and delimit the corridors 47. The section of the corridors 47 can have various shapes, geometric or not, regular or not. In the example illustrated here, the corridors 47 all have a polygonal section.

In an upstream or downstream plane to that of the section in FIG. 3, the shapes of the same corridors can be different, with a progressive evolution. Thus, not only can the size of the corridors change, in particular by following the trend of the variation of the envelope, but the very nature of the shape of the corridors can change (this is illustrated in FIG. 5). By "corridor size" is meant here the width (the largest circumferential measurement) of a corridor and the height (the greatest radial measurement) of a corridor.

Conversely, the corridors 47 can have a behavior that is contrary to the trend of the variations of the envelope: the corridors can shrink in section while the section of the envelope increases. Each corridor can also have a trend independent of the other corridors.

The envelope 44 includes at least one passage 49 arranged in the walls 41, 42, 43. In this example, the passage 49 traverses all of the walls 41, 42, 43 and thus allows the circulation of the second fluid all around the fins 45.

All of the fins 45 and of the envelope 44 are integral, produced by an additive manufacturing process, such as ALM (additive layer manufacturing) from aluminum or titanium powder, for example. During manufacture, the thickness of the layers can be between 10 μm and 150 μm, which makes it possible to achieve a thickness for the walls of the exchanger of between 0.3 mm and 4 mm. The walls of the envelope 44, which must resist the ingestion of objects and house the oil passages 49 are preferably thicker than the fins 45, the function of which is to conduct heat efficiently.

The thickness e of the walls 45 or the thickness E of the envelope 44 can vary according to the three dimensions of the space. For example, when the envelope 44 and the corridors 47 grow along the axis 14, the thickness of the walls 41, 42, 43 and the fins 45 may also increase. Alternatively, the thicknesses e, E can vary independently of the variations of the envelope 44 or the corridors 45. Alternatively, the thicknesses e, E can be constant.

FIG. 3 also shows the angles αmin and αmax on which the envelope extends. The angle αmin corresponding to the smallest circumferential width (denoted Lmin in FIG. 4) and the angle αmax corresponds to the largest circumferential width (denoted Lmax in FIG. 4). The ratio αmax/αmin can be greater than 10%. This value characterizes circumferentially the divergence/convergence of the exchanger. This difference in angle makes it possible to substantially slow down the flow of air following its entry into the exchanger 40 and allows aerodynamic management of the first fluid which does not enter the exchanger 40.

FIG. 3 shows critical points 62, 64, 66, 68, 70, 72 which are here the edges of the corridors 47.

Figure 4:
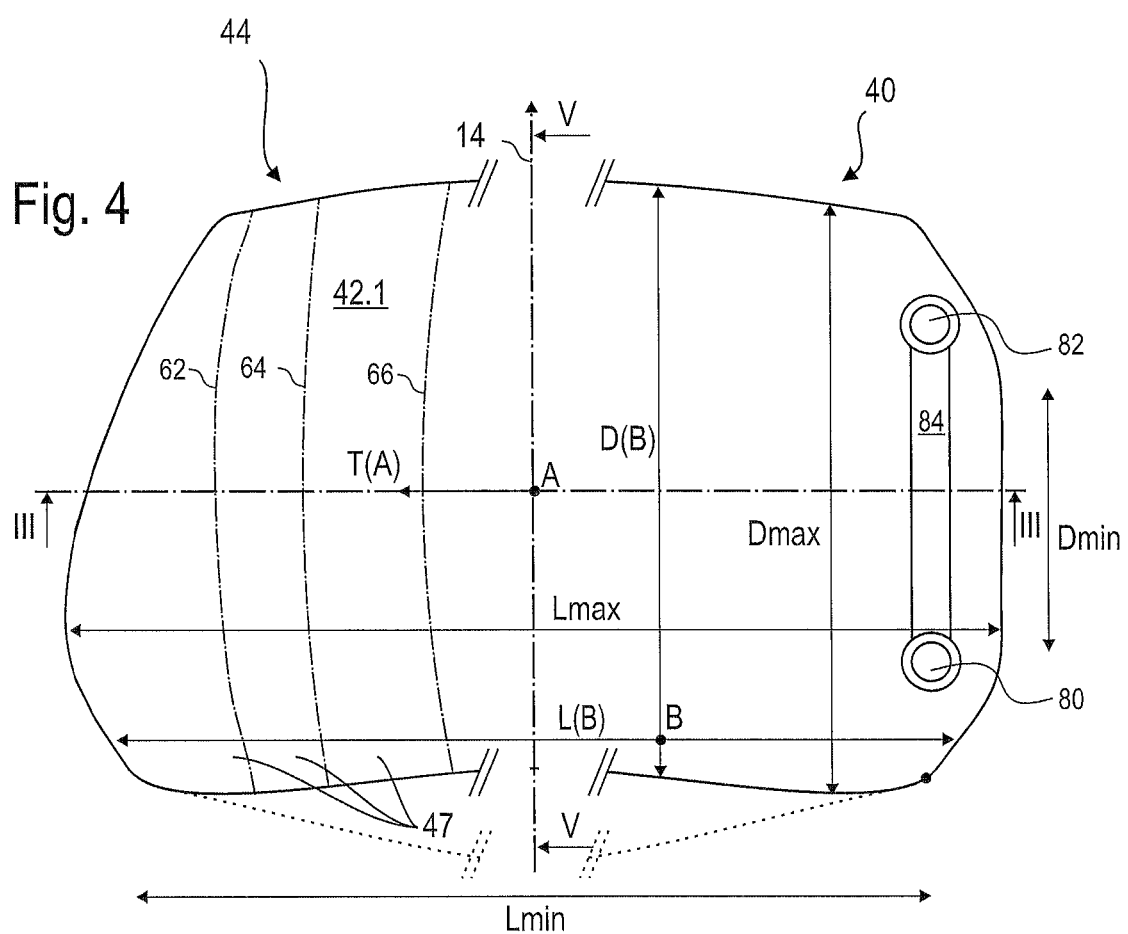
FIG. 4 shows a radial top view of the exchanger.

The passage 49 allows the second fluid to flow between an inlet manifold (noted 80 in FIG. 4) and an outlet manifold (noted 82 in FIG. 4). The inlet and outlet manifolds are preferably integral with the exchanger 40 and communicate with the passage 49. As can be seen in FIG. 4, the manifolds are advantageously circumferentially aligned.

A bypass 84 connecting the collectors can be fitted in the exchanger 40. The latter appears detached from the exchanger because FIG. 3 is a section not showing the elements in the background. The bypass 84 allows, under the action of shutters or valves (not shown), to bypass the passage 49 and to pass the second fluid directly from the inlet manifold to the outlet manifold.

With reference to FIGS. 3 and 4, the inlet and outlet manifolds 80, 82 may be formed by bulges radially outside the envelope 44. The bypass 84 may be tubular and parallel to the axial direction.

FIG. 4 illustrates a plan view perpendicular to the direction R (A) of FIG. 3, seen radially from the outside of the exchanger 40. The representation of the envelope 44 is here flattened and truncated at its center. FIG. 4 is oriented such that upstream is at the bottom of the figure.

This view illustrates the envelope 44 and in particular its axial dimension (denoted D (B) at point B), which varies circumferentially between Dmin at its circumferential ends and Dmax. Similarly, this figure shows the variations in the circumferential width of the exchanger (noted L (B) at point B), between a minimum value and a maximum value. This width is a curvilinear dimension in space.

It is observed that to allow better penetration of air into the exchanger, the envelope can be tapered upstream. In dotted lines at the bottom of FIG. 4 is shown an alternative for the upstream edge of the envelope 44 showing a nearly zero circumferential width upstream of the exchanger 40 and then growing rapidly from upstream to downstream.

The edges of the corridors 62, 64, 66 are here represented in dash-dotted line to illustrate the dimensions of the corridors 47 which are not straight or parallel to the axis 14. It is observed that in the example illustrated, the increasing or reduction trends of the envelope 44 are followed by the corridors 47.

FIG. 5 illustrates diagrammatically and in a plane comprising the axis 14, an exchanger 40 as illustrated above. The scales are not respected in order to facilitate understanding of the figure.

The exchanger here is subdivided into three thirds: an upstream third 401, a central third 402 and a downstream third 403.

A protective grid 96 aims to protect the fins 45. This grid 96 can be integrally formed with the envelope 44 and the fins 45.

A retardation chamber 98 and an acceleration chamber 99 can be provided to slow down and then accelerate the air flow. These chambers 98, 99 can take the form of a variable section channel.

FIG. 5 also shows the lines 68, 70 and 72 identified in FIG. 3. It is observed that the height (radial) of the corridor 47 varies along the axis between a value hmax and a value hmin. In this case, the variations in height of the corridor 45 follow the trend of variations in the envelope 44, that is to say an increase at least in the upstream third 401, then a decrease at least in the downstream third 403. This makes it possible to obtain the same effects for the air which passes through the exchanger 40 as for the air which bypasses it, while having the same effects produced by the fins 45 as by the envelope 44: slowing down for improving the thermal exchange and then accelerating for reinsertion of the air that flows through the exchanger into the path.

If the variations of the envelope 44 and the corridors 47 are illustrated here as increasing then decreasing, from upstream to downstream, the person skilled in the art will understand that various alternatives are possible, in particular a decrease followed by a growth or more complex variations with inflection points.

Upstream and downstream of the envelope 44, the external surface 41.2 and the internal surface 41.1 of the internal wall 41 meet. This joint can be arranged to minimize pressure losses, for example with a leading edge 41.3 and a trailing edge 41.4, in the shape of a blade or a wing. The joint also protects the passages 49 at the heart of the walls 41, 42. Thus, the air which bypasses the exchanger 40 and remains in the path 29 will be guided by the internal surface 41.1 and the air which enters the exchanger 40 will be guided by the external surface 41.2. These two flows joining at the outlet of the exchanger with the least possible turbulences thanks to the presence of a suitable trailing edge 41.4.

Similarly, the fins 45 meet upstream and downstream of the exchanger and can therefore be fitted with a leading edge and a trailing edge (not shown).

In the internal 41 and external 42 walls are arranged the passages 49 for the second fluid. These passages can form circuits in a plane perpendicular to the axis 14. Alternatively or in addition, they can form coils or helices to propagate the second fluid from the inlet manifold 80 to the outlet manifold 82.

The sections VI and VII of the corridor 47 materialize the change in nature that the corridors 47 can have, in this case a pentagon in the plane VI which becomes an ellipse in the plane VII.

FIG. 5 finally illustrates the wall of the casing 28 and shows that the exchanger 40 can be buried in the casing 28 with a depth Z. The ratio Z/Hmax can be greater than 20%. According to this example, the external surface 42.1 of the external wall 42 is not in contact with the air.

Alternatively or in addition, the exchanger 40 can be buried in an internal casing, its internal surface 41.1 therefore not being in contact with air.

The heat exchanger according to the present application is preferably intended to exchange heat between air and oil but is not limited to this use.

Furthermore, if in the illustrated embodiments, the main direction of air flow 15 is parallel to the axis 14 of the turbomachine 2, it may be otherwise and the curvature of the walls 41, 42 of the exchanger can be such that the main direction of air flow 15 is inclined relative to the axis 14, the air flow therefore being generally conical, as opposed to a cylindrical flow in the examples illustrated above.

We claim:

1. A heat exchanger comprising:
   a plurality of fins arranged as a network and delimiting corridors;
   an envelope comprising:
      an internal wall and an external wall, the internal and external walls delimiting between them a channel for a flow of a first fluid in a main direction, the channel being, in the main direction, divergent and then convergent; and
   at least one passage for a flow of a second fluid being embedded in at least one of the internal and external walls;
   wherein the network of fins is arranged in the channel and connected to the internal and external walls;
   wherein the internal and external walls are arched, seen in a plane perpendicular to the main direction;
   wherein the envelope has a radial height between the internal wall and the external wall, the radial height defining a radial direction perpendicular to the main direction, the radial height of the envelope being variable along the main direction; and
   wherein the envelope as two side walls connecting the internal wall to the external wall and the envelope has a circumferential width between the side walls defining a circumferential direction perpendicular to the radial direction and to the main direction, the circumferential width being variable along the main direction.

2. The heat exchanger according to claim 1, wherein the radial height of the envelope and/or the circumferential width of the envelope increases in at least an upstream third of the envelope.

3. The heat exchanger according to claim 1, wherein the radial height of the envelope and/or the circumferential width of the envelope decreases in at least a downstream third of the envelope.

4. The heat exchanger according to claim 1,
   wherein the at least one passage extends in the internal wall and in the external wall, as well as, in at least one of the side walls.

5. The heat exchanger according to claim 1, wherein the at least one passage extends in a plane that is perpendicular to the main direction.

6. The heat exchanger according to claim 1, wherein at least one of the internal and external walls has an internal surface and an external surface, wherein both internal and external surfaces contact the first fluid.

7. The heat exchanger according to claim 1, wherein at least one of the internal and external walls has an internal surface and an external surface, wherein the internal and external surfaces are joined together by a leading edge and by a trailing edge.

8. The heat exchanger according to claim 1, wherein the envelope has an axial length which varies circumferentially between a minimum value and a maximum value, these two values being comprised between 100 and 150 mm, and wherein the envelope has a circumferential width which varies, axially, between a minimum value and a maximum value, these two values being distinct from one another by at least 10%.

9. The heat exchanger according to claim 1, wherein the corridors extend parallel to the main direction.

10. The heat exchanger according to claim 1, wherein the fins extend perpendicularly to the internal and external walls, seen in a plane perpendicular to the main direction.

11. The heat exchanger according to claim 1, wherein the fins form patterns, seen in a plane perpendicular to the main direction, the patterns comprising at least one of: a honeycomb, polygons, ellipses, or any heterogeneous combination thereof.

\* \* \* \* \*